July 15, 1947. L. A. AMTSBERG 2,423,957
DRIVER FOR CLINCH NUTS AND THE LIKE
Filed Sept. 14, 1942 4 Sheets-Sheet 1
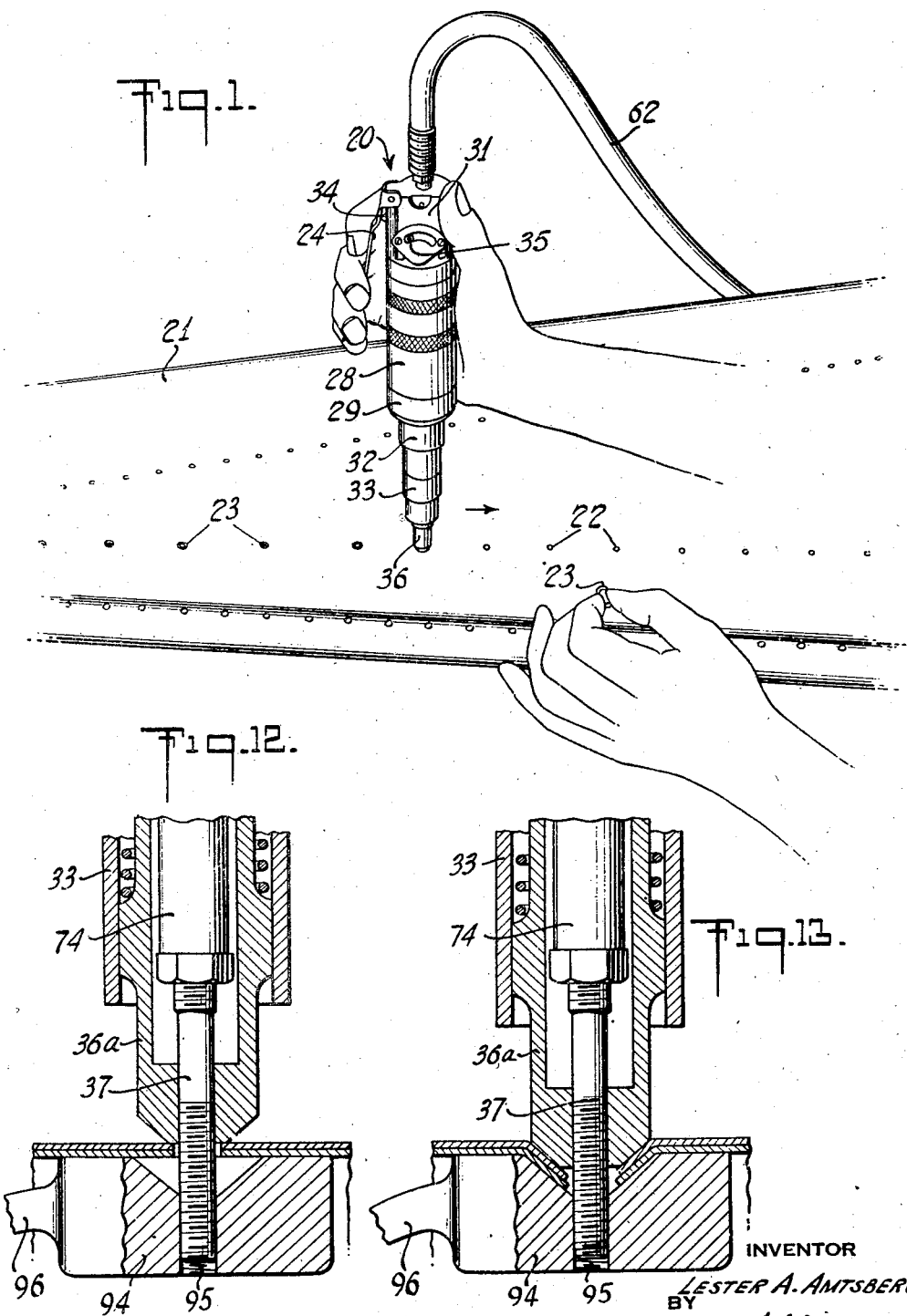
INVENTOR
LESTER A. AMTSBERG.
BY
Raymond G. Mullee
ATTORNEY

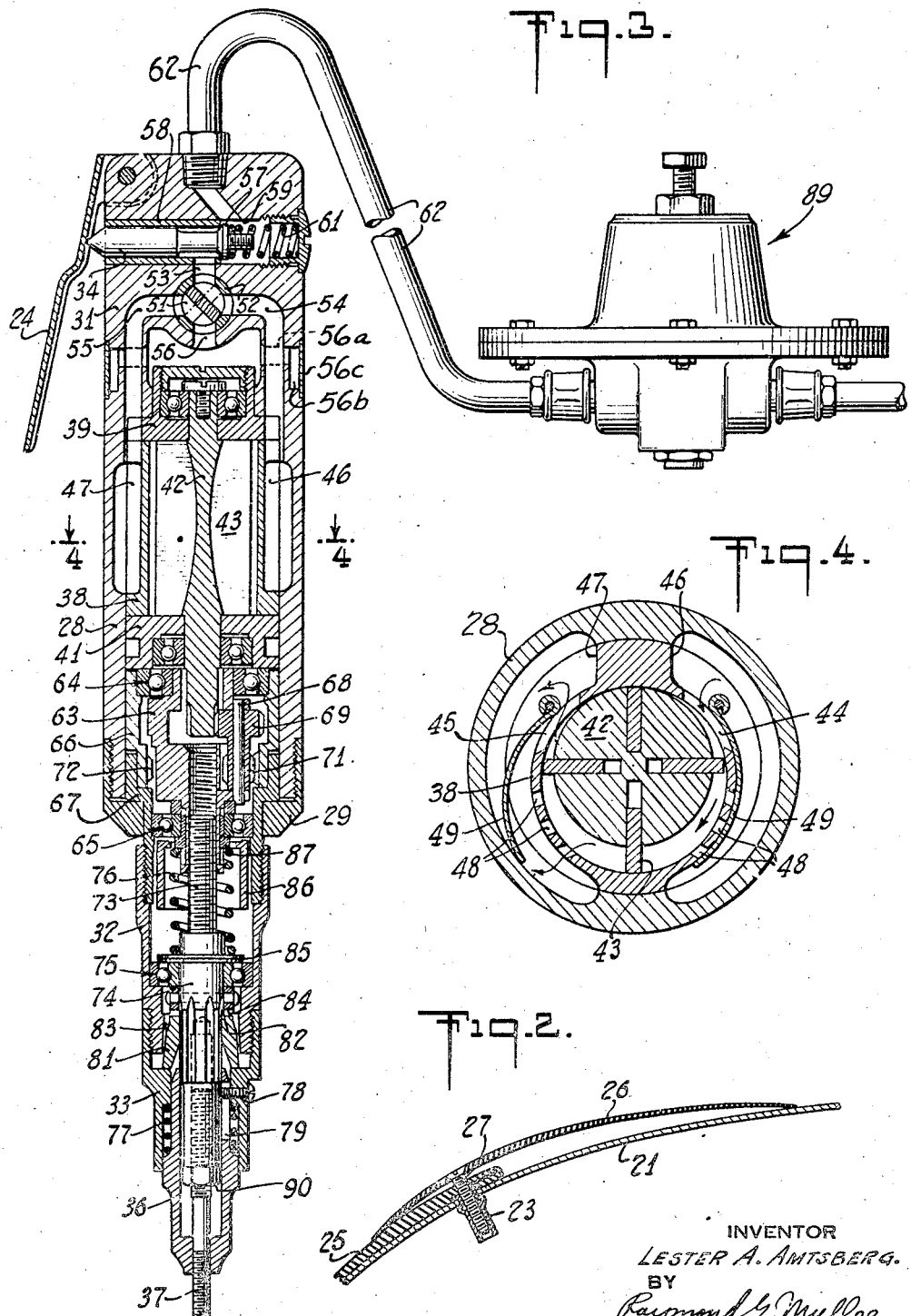

July 15, 1947.  L. A. AMTSBERG  2,423,957
DRIVER FOR CLINCH NUTS AND THE LIKE
Filed Sept. 14, 1942  4 Sheets-Sheet 3

INVENTOR
LESTER A. AMTSBERG.
BY
Raymond G. Mullee
ATTORNEY

July 15, 1947. L. A. AMTSBERG 2,423,957
DRIVER FOR CLINCH NUTS AND THE LIKE
Filed Sept. 14, 1942 4 Sheets-Sheet 4
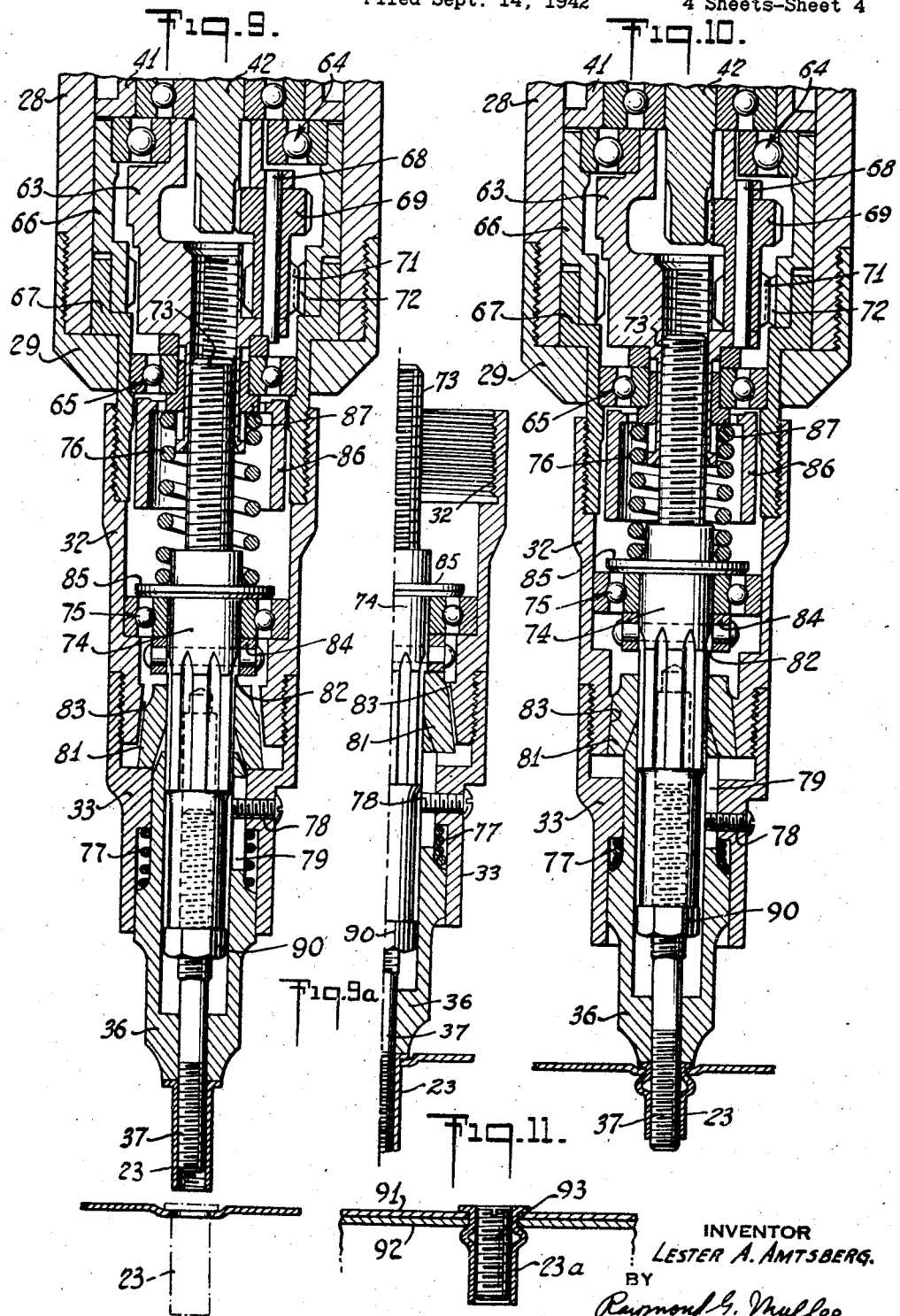
INVENTOR
LESTER A. AMTSBERG.
BY
Raymond G. Mullee
ATTORNEY Patented July 15, 1947

2,423,957

UNITED STATES PATENT OFFICE 2,423,957

DRIVER FOR CLINCH NUTS AND THE LIKE

Lester A. Amtsberg, Cleveland, Ohio, assignor to Chicago Pneumatic Tool Company, New York, N. Y., a corporation of New Jersey Application September 14, 1942, Serial No. 458,220

14 Claims. (Cl. 218—19)

This invention relates to tools which accomplish their function by imparting to the work performing implement, rotary and axial motions in successive steps and in opposite directions.

At present, tools of this class are used chiefly in the installation of clinch nuts but they are adapted for other uses, such as riveting and dimpling of metal sheets. Clinch nuts are tubular, internally threaded elements mounted in walled structures for use as screw anchors where the work is accessible from one side only or where the wall is too thin for screw threading. Clinch nuts thus have many applications in airplanes, the construction of which emphasizes economy in space and in weight of material. The nut has a shank portion and a flanged head, the former being inserted through a drilled hole in the wall and expanded inside the wall while the flanged head engages the outside surface thereof.

The work performing implement of the tool has the form of a threaded bit, which may be engaged with the internal threads on the clinch nut in response to relative rotary motion therebetween and which will then crimp or collapse the nut against an anvil when such rotary motion is discontinued and a relative axial pulling motion effected. A power tool for carrying out the several steps of the installation is disclosed in applicant's prior application Serial No. 424,964, filed December 30, 1941. The present tool is similar to that of the earlier application in the general objects of its design which are to drive the bit with a single prime mover in the form of a rotary motor, and to initiate the upsetting step of the operation under the control of the anvil which moves axially relative to the tool housing under the reactive thrust of the clinch nut as the bit screws into the nut.

The general object of this invention is to improve upon the original design by simplification, leading to greater adaptability, a decrease in the manufacturing cost of the tool, and a reduction in the degree of skill required to operate it. Specific features of improvement are a smaller diameter at the front end of the tool permitting it to fit into close quarters, and the use of a nonrotating anvil. The latter is desirable to avoid marking the clinch nuts or other work against which the anvil is pressed.

Another object is to prevent the rotating parts from becoming jammed, or frictionally locked, in the event that the motor is not stopped in time at the end of the power operation.

A further object is to produce a rugged operating mechanism which will sustain heavy loads, such as are encountered in dimpling.

Other objects and structural details of the invention will be apparent from the following description when read in conjunction with the accompanying drawings, wherein:

Fig. 1 is a view of the tool in elevation, showing the manner in which it is used to install clinch nuts in an airplane wing;

Fig. 2 is a fragmentary view, in cross-section, of the airplane wing, showing a clinch nut mounted therein and de-icing equipment attached to the wing by means of the nut;

Fig. 3 is a view of the tool in longitudinal section, and of a regulator for controlling the pressure of the air supplied to the tool, the tool being shown inactive with the throttle valve closed;

Fig. 4 is a view of the rotary air motor in cross-section taken substantially along the line 4—4 of Fig. 3;

Figure 5:
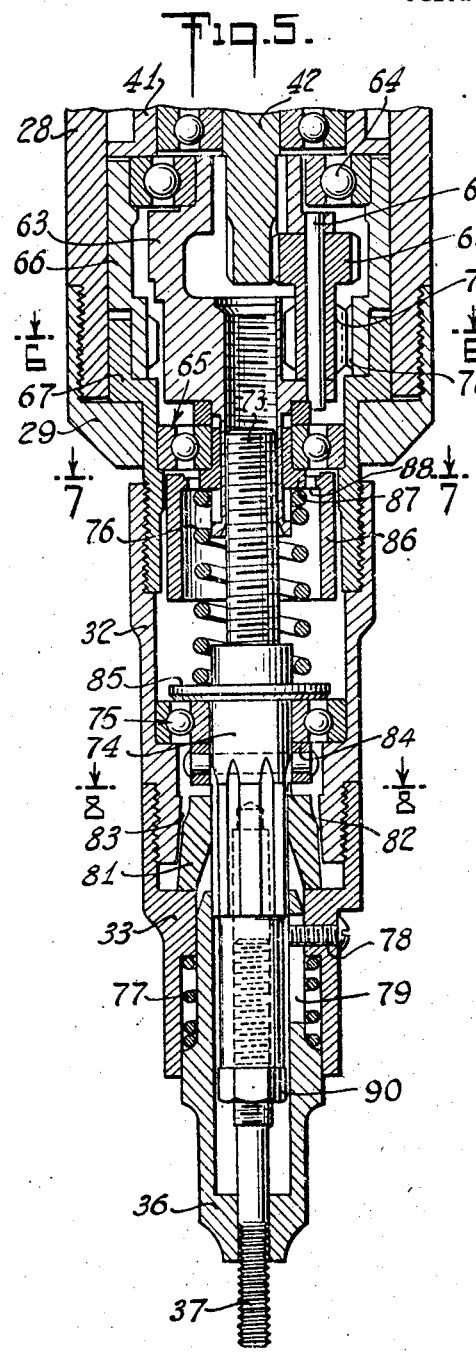
Fig. 5 is a fragmentary view reproducing the front end of the tool as shown in Fig. 3, on an enlarged scale.
Figure 6:
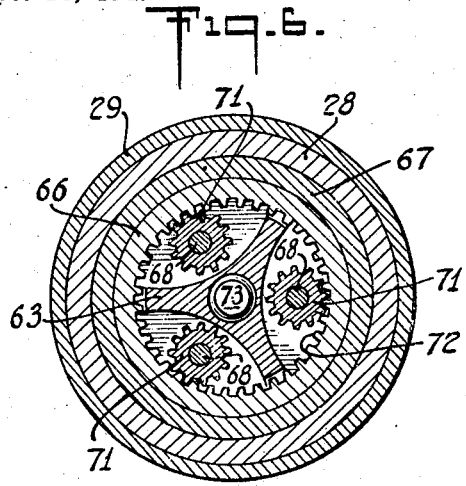
Figure 7:
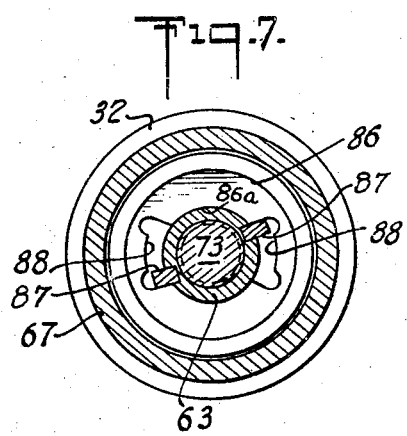
Figure 8:
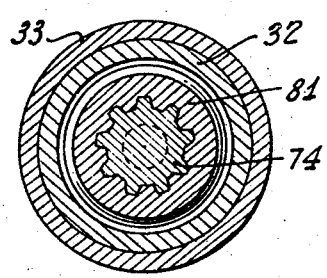

Figs. 6, 7 and 8 are views in cross-section taken substantially along the respective lines 6—6, 7—7 and 8—8 of Fig. 5, Figs. 7 and 8 being on a larger scale than that of Figs. 4, 5 and 6;

Fig. 9 is a view similar to Fig. 5, showing the clinch nut mounted on the bit preparatory to inserting it in the work, the anvil having been moved a short distance inwardly of the tool housing under the thrust of the clinch nut;

Fig. 9a is a fragmentary view in half longitudinal section similar to Fig. 9 but showing the anvil moved a further distance rearwardly relative to the tool housing and bit holder until the anvil has reached the limit of its rearward movement relative to the bit holder;

Fig. 10 is a view similar to Fig. 9, showing the parts at the end of the driving operation and before the motor is reversed to disengage the bit from the collapsed nut;

Fig. 11 is a view of the clinch nut used as a rivet to hold together a pair of metal sheets; and Figs. 12 and 13 are fragmentary views of the tool modified to function as a dimpling machine, and showing the tool respectively at the start of and at the end of a dimpling operation.

According to the present conception of a clinch nut driver, the tool resembles in appearance and manner of use pneumatic tools of a class long used for light screw driving and nut running operations. These tools are generally cylindrical and have a slim elongated shape facilitating their application to work of difficult access. They are, in addition, light in weight and adapted to be held and manipulated with one hand, leaving the other hand of the operator free to hold, and subsequently to locate, the next screw or nut.

Referring to Fig. 1, one form of the tool of the invention is shown as it is used to mount clinch nuts in the wing of an airplane as a preliminary step in the installation of de-icing equipment. The tool, indicated generally at 20, is held at right angles to the surface of the wing 21, and is moved from one to another of a series of drilled holes 22, mounting the clinch nuts 23 therein. The body of the tool itself constitutes a handle grip, and, together with a throttle lever 24 is encompassed by one hand of the operator. In the drawing the tool is engaged with the work ready to set a nut, while the operator holds another nut ready to be mounted in the next drilled hole 22.

A fragment of the wing 21, in cross-section, appears in Fig. 2 where a clinch nut is shown providing a means of attachment for the de-icing equipment. In the installation of the nut, its shank is expanded to a bulbous state inside the skin section of the wing while the flanged head engages the outer surface thereof, the nut thereby being effectively locked against longitudinal movement. Rotation of the nut is inhibited by frictional contact with the wing, and, in some instances, is positively prevented by adapting the nut and drilled hole 22 for a keyed connection. Following the mounting of the clinch nuts, the edge of the wing, according to a varying practice, is overlaid with a rubber sleeve 25 and a fairing strip 26 which are secured thereto by screws 27 passed through openings in the de-icer elements into the clinch nuts and turned into threaded engagement with the internal threads therein.

The structure of the clinch nut driver includes a tubular motor housing 28, a clamp nut 29 at the front of the housing and a block 31 at the rear of the housing, the latter being preferably an integral part of the motor housing. The clamp nut 29 supports a forwardly extending sleeve assembly comprising parts 32 and 33, while the block 31 provides an air inlet and mountings for a throttle valve and a reversing valve, operating respectively under the control of a plunger 34 and a lever 35.

The sleeve assembly supported by clamp nut 29 effects a gradual decrease in the diameter of the tool toward the front end thereof which is defined by an anvil 36 having a tapered nose of approximately the same width as the head of the clinch nut. As shown in Fig. 3, the anvil 36 is slidably mounted relative to the sleeve 33 and surrounds a threaded bit 37 which extends through and beyond the anvil for engagement with the clinch nut. Following the preferred method of installation, the clinch nut is held in the hand and pressed lightly into cooperative relation with the bit which is caused to enter the nut through the head thereof and then rotate into threaded engagement therewith. When the head of the nut makes contact with the nose of anvil 36, the operator stops the motor and inserts the bit, along with the surrounding shank of the clinch nut, into a drilled hole in the work. As the head of the nut reaches the surface of the work, the throttle valve is reopened, and rotary movement of the bit is again initiated, followed automatically by an axial, non-rotative, pulling movement thereof. The clinch nut, being seated on the anvil 36 and thereby held against axial movement at its upper end buckles at the shank portion above the internal threads and expands into contact with the lower or inner surface of the work. Upon completion of the setting action, axial movement of the bit is discontinued. The operator then reverses the direction of rotation of the motor, thereby driving the bit so as to release it from the clinch nut. The latter is left rigidly mounted in the work with its threads unstripped and in condition to receive such fastening means as may be used in subsequent fabrication.

In each direction of movement through which it travels in the installation of a clinch nut the bit 37 is driven by a reversible rotary air motor contained in the housing 28. As shown in Fig. 3, the motor comprises a cylinder 38 closed at its opposite ends by plates 39 and 41 which serve the added purpose of supporting bearings for a rotor 42. Referring also to Fig. 4, the axis of the rotor 42 is offset from the longitudinal axis of the cylinder bore and said rotor carries radially sliding vanes 43, the outer ends of which are in scraping contact with the inner wall of the cylinder. The eccentric mounting of the rotor 42 relative to the cylinder bore is such as to create a crescent shaped chamber within the cylinder 38 partitioned by the vanes 43 into a plurality of separate pockets. Air is admitted to the cylinder and exhausted therefrom alternatively through a pair of ports 44 and 45 located respectively in arcuate external recesses 46 and 47 on opposite sides of the cylinder. When one port 44 or 45 functions as the live air port, the other is open to exhaust. Thus, the air entering the cylinder is received by the successive pockets which expand in size as they revolve under the influence of the live air, and are opened to exhaust while diminishing in size. In order that the inlet and exhaust may be properly timed without interfering with the reversibility of the engine a set of auxiliary exhaust ports 48 is provided on each side of the cylinder. These sets of ports increase the effective length of whichever port 44 or 45 happens to be on the exhaust side but do not increase the length of the port on the inlet side. This is accomplished by a spring pressed plate 49 associated with each set of auxiliary exhaust ports and mounted for pivotal movement. The plates normally close both sets of ports 48 but the plate on the exhaust side of the cylinder is forced open by the air in the diminishing pockets. On the inlet side the plate 49 is held in closed position by the combined efforts of spring pressure and live air within the recess 46 or 47 acting over the entire area of the plate.

Flow of the air to the recesses 46 and 47, and thereby the direction of rotation of the motor, is controlled by a reversing valve 51 (Fig. 3), mounted in a transverse bore in the block 31 and rotatable within a bushing 52. The valve 51 controls the flow of air from an inlet 53 to diagrammatically indicated supply passages 54 and 55, leading respectively to the arcuate recesses 46 and 47, and connects the supply passages selectively to the live air source and to exhaust through a port 56. The latter communicates at all times with the atmosphere through radial exhaust ports 56ᵃ and annular groove 56ᵇ which is partly encompassed by the usual exhaust deflector 56ᶜ. The reversing valve performs its function through oppositely disposed grooved portions registering with the several compressed air ports and passages. By rotative positioning of the valve, live air is directed through one groove from the inlet 53 to a motor passage 54 or 55 while the other groove connects the remaining motor supply passage to exhaust port 56. With the reversing valve set to the position shown in full lines in Fig. 3 air is admitted to the motor by way of passages 54, recess 46 and port 44 and the rotor 42 accordingly is driven in a clockwise direction as viewed in Fig. 4, for setting the clinch nut. When the valve is turned through manipulation of the lever 35 (Fig. 1) to the position shown in dotted lines in Fig. 3, motor passage 55 and communicating areas receive the live air while passage 54 is opened to the atmosphere through port 56, the direction of rotation of the rotor being in this instance reversed or counter-clockwise as viewed in Fig. 4.

Pressure fluid is admitted to the tool under the control of a throttle valve 57 at the inner end of the plunger 34. The plunger 34 is reciprocable within a bushing 58 mounted in a bore 59 and ported at a location of registry with the reversing valve inlet 53. The valve 57 lies beyond the inner end of the bushing 58 and is pressed by a coil spring 61 into engagement therewith to cut off communication between the port 53 and the area of bore 59 on the other side of the valve. This area is supplied constantly with pressure fluid, being connected directly to the pressure fluid source through a flexible hose line 62. The throttle valve 57 remains normally closed by reason of the pressure of spring 61 but may be moved from its seat by depression of the plunger 34 to permit a flow of air around the reversing valve and thence to the motor. Accordingly the tool is inactive except during those periods in which the operator squeezes the lever 24 to actuate the plunger 34 and hold open the throttle valve. Upon release of the lever the valve is returned immediately to a seated position upon the inner end of the bushing 58 and operation of the tool is interrupted.

The rotor 42 of the reversible motor is operatively connected through reduction gearing to a spindle 63 which may be considered the driving shaft of the tool since it is through this element that the described rotary and axial movements of the bit are effected. Referring to Fig. 5, the spindle is rotatably mounted in advance of the cylinder end plate 41 in axial alignment with the rotor 42. Rearward and forward hubs on the spindle are supported in respective bearings 64 and 65 mounted in a sleeve assembly consisting of elements 66 and 67. At their adjacent ends the elements 66 and 67 have interfitting annular flanges and the sleeve 67 is reduced in diameter to seat on the clamp nut 29 and extend through a central opening therein. The rear portion of the spindle is hollow and receives an extension of the rotor 42. Intermediate the ends of the spindle circumferentially spaced vertical openings are formed, in each of which is mounted a pin 68 furnishing a bearing for a planetary gear unit comprised of integrally formed pinions 69 and 71 (see Fig. 6). The pinion 69 projects into the hollow interior of the spindle and is engaged with the toothed inner end of the rotor 42. The pinion 71, constrained to rotate with the pinion 69 under the influence of the rotor, rides in a stationary annular gear 72 formed on the inner surface of the sleeve 66. The several gear units are in this manner caused to revolve around the rotor, and, by reason of their connection to the spindle 63 through the pins 68, to effect a rotary movement of the spindle at reduced speed.

In front of the extension of rotor 42 the interior of the spindle 63 is provided with right hand screw threads complementing threads on the shank 73 of a holder 74 for the bit 37. The spindle and bit holder are axially aligned, with the shank 73 extending into the spindle through the front end thereof and engaging with the threads therein. Bit holder 74 rotates in a thrust bearing 75 within the sleeve 32, the sleeve 32 being threaded on to the forwardly projecting portion of the sleeve 67. Means acting in conjunction with the complementary screw threads on the spindle 63 and shank 73 to resist relative rotation between the spindle and bit holder is represented by a helical spring 76 surrounding the telescoping portions of the spindle and bit holder and interposed between abutments thereon. Except when subject to an overpowering torque resistance the spring 76 enforces rotation of the bit holder 74 with the spindle 63 in whichever direction it may be driven by the motor. The bit holder extends forwardly into the anvil 36 and has the bit 37 rigidly secured in its outer end. The anvil 36 is slidably mounted relative to the sleeve 33 which is screwed on to the reduced front end of the sleeve 32. Relative sliding movement of the anvil is resisted by a spring 77 surrounding the anvil and confined within a counterbore in the front of the sleeve 33 by an annular shoulder on the anvil. Rotary movement of the anvil 36 is positively prevented by a screw 78 extending radially through the sleeve 33 into a slot 79 in the anvil.

The anvil 36 and bit 37 have a relative axial movement when, in the course of the rotation of the bit into the clinch nut, the anvil comes into contact with the clinch nut and then is prevented by engagement with the flanged head of the nut from following the bit as it continues to screw into the nut. After this engagement continued rotation of bit 37 results in movement of the holder 74, thrust bearing 75 and housing 28, 32, 33 toward the rivet head and anvil 36, thereby compressing spring 77 with resulting outward travel of the bit 37 relative to the anvil, and this forward movement of the housing causes a cone 81 surrounding the bit holder 74 rearward of the anvil to approach and contact the rear end of the anvil. At the end of the cone 81 facing the anvil an internal taper is formed, complementing an external inclined surface on the anvil. The angle of the respective tapers is such as to effect a wide area of contact between the elements, increasing the resistance to relative rotary movement therebetween. The inner periphery of the cone 81 is grooved for engagement with vertical splines on the bit holder 74 (see Fig. 8). The cone accordingly partakes of the rotation of the holder but is free to move relatively thereto in an axial direction. Longitudinal movement of the holder 74 relative to the cone 81 under the pull of the bit 37 is limited by an abutment or shoulder 82 on the holder. The cone 81 rotates with the bit holder as the bit 37 advances through the clinch nut. When the cone moves into frictional engagement with the anvil, which is held against rotary motion by the screw 78, it at first slips on the stationary anvil and continues to rotate with the holder 74 until shoulder 82 contacts cone 81 under the pressure of spring 76, whereupon the resulting frictional force interrupts rotation of the cone, the bit holder and the bit. At this point the bit 37, anvil 36, cone 81 and housing sleeves 32 and 33 occupy the relative position shown in Fig. 9a, the cone being not quite contacted by sleeve 32.

Thereafter, the spindle 63, being geared directly to the rotor 42, continues to turn, but since shank 73 can rotate no longer due to the contact of shoulder 82 with cone 81 and the cone 81 with stationary anvil 36, the energy in rotating spindle 63 can only cause said spindle to advance along shank threads 73 or cause shank 73 to be drawn rearwardly into spindle 63. Since the former constitutes the path of least resistance (the latter would involve the upsetting of the clinch nut) that is what happens, namely, spindle 63 advances along shank 73 carrying forward with it housing 28, 32, 33 while the anvil 36, cone 81 and bit holder 74 remain stationary. The forward movement of spindle 63 and the housing takes place in opposition to the pressure of spring 76 and during this forward movement the shoulder on housing section 32 moves away from thrust bearing 75. The locking cone has an outer periphery inclined rearwardly toward the cone axis and cooperable with a similarly shaped surface 83 on the surrounding end of sleeve portion 32. After a slight forward movement from the relationship of Fig. 9a the frusto-conical surface 83 seats firmly on cone 81, establishing a wedged locking relationship between the housing and the cone, and the housing can advance no farther.

Upon termination of the forward movement of the housing 28, 32, 33 the spindle 63 also becomes held against forward axial movement but continues to rotate. As a result, the bit holder 73, 74 then starts a rearward movement relative to the cone and to the anvil, and, in so doing, collapses the clinch nut against the anvil.

A ring 84 is mounted on, and pinned to, the holder 74. The forward face of the ring is flush with the shoulder 82 on the holder and in effect forms a continuation of said shoulder. The rear face of the ring provides a seat for the inner raceway element of the thrust bearing 75. The ring 84 also serves, in cooperation with a collar 85 secured to the holder rearward of the bearing 75, to enforce axial movement of the thrust bearing with the holder. The collar 85 further provides a mounting for one end of the spring 76. The opposite end of the spring 76 is received in a cup 86 which normally turns with the spindle 63. As shown also in Fig. 7, the cup 86 is drivingly connected to the spindle by keys 87 stationed in keyways in the spindle and extending into wide slots 88 in the cup. The slots 88 communicate with and radiate from the bore 86a. The upper end of the spring 76 surrounds the cylindrical extension on spindle 63 and abuts against the keys 87. It is also adapted to contact the partly closed end of the cup 86 to hold the latter against axial separation from the keys 87. Each of the keys 87 has a longitudinal portion extending within bearing 65 and a transverse portion abutting against the front end of said bearing. Considerable angular freedom is thus given the cup so that when the motor is reversed the spindle moves through a part turn of lost motion relative to the cup. The cup 86 functions as a safety device engageable by the collar 85 to limit rearward axial movement of the bit holder 74. Without such a device the holder might jam onto the spindle, so tightly that the motor could not break it loose.

It is not intended, however, that the degree of set imparted to each clinch nut should be that resulting from a maximum axial travel of the bit. A clinch nut of given kind and size has individual characteristics as to the extent of upset required to give it maximum strength and resistance to torsional loads with a minimum distortion of metal. To secure the proper upset and to insure that it is applied uniformly to all of a series of nuts a pressure regulator 89 is interposed in the pressure fluid supply line 62. Thus, when by experiment it has been determined that the clinch nuts to be installed are most advantageously upset under a given pressure, for example 50 pounds per square inch, the regulator 89 is adjusted accordingly to prevent any higher pressure from being supplied to the tool. When the resistance of the clinch nut equals the maximum motor torque, as defined by the regulator, the motor stalls. The regulator 89 may follow any conventional construction, being essentially a variable step-down device for reducing the factory line pressure, of say 90 pounds, to any selected lower pressure when applied to a particular tool or tools. Other instrumentalities may be used for limiting the force applied to the clinch nut, such as a friction or kick-out clutch placed between the motor and driving shaft. The latter method would be used in an electrically powered tool.

The length of the clinch nuts varies in accordance with the thickness of the walls in which they are mounted. Accordingly, the extension of bit 37 beyond anvil 36 is adjustable by means of lock-nut 90.

In the operation of installing a clinch nut, with the parts as in Figs. 3 and 5 the bit is inserted in the nut by holding the nut pressed lightly against the bit, or the bit pressed lightly toward the nut in the case where the nut is first placed in the rivet hole, with the throttle valve 57 opened with the reversing valve 51 set to drive the bit in a right hand direction whereby to engage the threads on the bit with the complementary threads in the nut. If the nut is screwed on to the bit before applying the tool to the work, the operator releases the throttle control lever 24 when the nut reaches the anvil 36 and the motor stops before any appreciable axial movement of the bit through the anvil is effected (see Fig. 9). In the situation where the nut is first inserted into the rivet hole this release of the throttle control lever 24 is unnecessary. Sufficient movement of the bit is required before it pulls the surface 83 against the locking cone 81 to allow for motor coasting and error of judgment. Then, when the bit and clinch nut are inserted in the drilled hole, the throttle valve is again opened and the bit screws farther into the clinch nut, the nut being frictionally or positively held against rotation.

Assuming that the clinch nut 23 is stationary, the successive steps or stages of operation are as follows:

Step 1.—As the bit 37 is screwed into clinch nut 23, all parts of the tool, including housing 32, 33, bit 37, motor spindle 63 and anvil 36 advance axially relative to the clinch nut until the front end of the anvil seats against the flange on the clinch nut. During this step the bit rotates in unison with the motor spindle 63. The housing, anvil and clinch nut do not rotate at any time.

Step 2.—(Fig. 9). The bit continues to rotate with the motor spindle, and the bit and all the other parts except the anvil continue to advance axially together, while the anvil is held stationary against the clinch nut 23. Forward movement of the housing and bit is resisted by the compression spring 77. The rotary and forward movements of the bit are arrested when the locking cone 81 is seized between the shoulder 82 and the tapered rear end of the anvil 36. Upon termination of Step 2, the parts occupy the position illustrated in Fig. 9a.

Step 3.—The bit 37 and holder 74 being locked against rotation by shoulder 82, cone 81 and anvil 36, further rotation of the spindle 63 pulls the threaded shank 73 axially to tend to move the bit holder 74 rearwardly. But since the bit 37 is fastened to the clinch nut 23 at this time, the bit does not at first move axially. At first this tendency of shank 73 to move rearwardly into spindle 63 is resisted by the threaded connection between the bit 37 and the clinch nut and the resistance of the clinch nut against collapse. Consequently this tendency for shank 73 to move rearwardly is transformed into actual movement of the housing 32, 33 forwardly. During such axial movement of the housing sleeve 33, spring 77 is further compressed to substantially its maximum amount and the shoulder on housing 32 normally contacting thrust bearing 75 moves forwardly away from said bearing. The forward axial movement of the housing during step 3 continues only for a very short distance, with a further very slight compression of spring 77, before the tapered locking surface 83 on housing member 32 seats on cone 81 which in turn remains seated on the tapered rear end of anvil 36. Thereupon forward movement of the housing is arrested and the cone becomes wedged in the housing to provide a further means for locking the cone against rotation.

*Step 4.*—(Power stroke). Upon termination of the forward movement of the housing the pulling force between spindle 63 and bit holder 74 continues. Since the housing cannot move forward the bit moves rearward, against the pressure of spring 76 and the resistance of clinch nut 23, to upset the clinch nut as shown in Fig. 10. During such rearward axial movement, the shoulder 82 and ring 84 move out of engagement with cone 81, but such disengagement does not release the cone and bit holder for rotation, since the cone continues to be held by the locking means comprising the tapered surface 83 and the tapered face of the anvil 36 frictionally engaging the cone under the axial pressure caused by the pull of the bit 37. The power stroke terminates when the motor stalls, or when the operator reverses the power supply thereto, or when the bit holder is permitted to run to the full end of its stroke. In the case last mentioned the collar 85 on bit holder 74 presses against the lower end of the cup 86, arresting rotation of the latter by causing it to be frictionally gripped between collar 85 and the outer element of ball bearing 65. Almost immediately thereafter, rotation of the spindle 63 is arrested by engagement of the keys 87 with the ends of arcuate slots 88 in the cup.

*Step 5.*—Upon reversal of the direction of rotation of spindle 63 the slots 88 in cup 86 permit the spindle 63 to rotate counterclockwise through a limited arc toward the Fig. 7 position before the cup joins in the reverse rotation thus providing a lost motion driving connection between the spindle and cup 86. As the spindle 63 rotates, bit holder 74 is still held against rotation by cone 81, surface 83 and anvil 36 and the spindle therefore backs up along threaded shank 73 to cause the housing to back away from the work. If cup 86 was contacted by collar 85 it moves back with the housing out of frictional locking engagement with collar 85 during the period of lost motion during which the spindle may rotate independently of the cup. Ordinarily the spring-back force of the rivet and the force of spring 77 maintain a tight enough connection between the threads of the rivet and the threads of the bit 37 and between the rivet and the stationary anvil that the bit 37 does not at first rotate upon reversal of the direction of rotation of the spindle 63 but maintains its relationship to anvil 36 as shown in Fig. 10. Therefore reverse rotation of spindle 63 causes it to back-up along shank 73. This of course pulls casing 28, 32, 33 rearward and breaks the frictional lock at cone 81. Ordinarily cone 81 remains in contact with surface 83 and thereby is carried back with casing element 32 and it is knocked out of frictional locking engagement with surface 83 when the casing backs up far enough for the top of cone 81 to contact shoulder 82—back almost to the Fig. 9a position. When the shoulder in section 32 recedes a trifle further, far enough to contact raceway 75 (Fig. 9a position), it can recede no further relative to holder 74.

*Step 6.*—As soon as the thrust bearing 75 is contacted by the shoulder in casing section 32 a further fractional turn of spindle 63 will set up sufficient pressure between the threads of spindle 63 and shank 73 to break the lock between the threads of bit 37 and the clinch nut, and between the cone 81 and anvil 36 if the cone happened to stick to the anvil, and thus to start bit 37 rotating reversely in unison with driving spindle 63. Thereafter the pressure between the threads of spindle 63 and shank 73 created by spring 76 turns bit 37 with spindle 63 and the rotating bit unscrews itself from the clinch nut. As the bit unscrews from the clinch nut spring 77 pushes the casing backward until the casing and anvil are restored to their initial position.

The motions of the various parts throughout the cycle, which comprises upsetting steps 1, 2, 3 and 4 and disassociating steps 5 and 6, are represented in the following diagram:

| Step | | | | | |
|---|---|---|---|---|---|
| 1 | $Hf$ | $Af$ | $Bfr$ | $Cur$ | $Ns$ |
| 2 | $Hf$ | $As$ | $Bfr$ | $Cur$ | $Ns$ |
| 3 | $Hf$ | $As$ | $Bs$ | $Cs$ | $Ns$ |
| 4 | $Hs$ | $As$ | $Bb$ | $Cs$ | $Ns$ |
| 5 | $Hb$ | $As$ | $Bs$ | $Cb$ | $Ns$ |
| 6 | $Hb$ | $As$ | $Bbr$ | $Cur$ | $Ns$ | where H designates the housing 32, 33; A, the anvil 36; B, the bit 37; C, the cone 81; N, the flanged rear end of the clinch nut 23; $f$, forward axial movement; $b$, backward axial movement; $s$, stationary; $u$, unrestrained in an axial sense; and $r$, rotatable.

As far as axial movement is concerned, the bit advances first with the anvil then, upon the anvil contacting the stationary clinch nut, advances ahead of the anvil, remains stationary for a moment, moves back during the power stroke, then, during the reverse movement, remains stationary while the housing moves back, and finally backs out of the clinch nut 23 carrying the casing back with it under the urging of spring 77.

If the operator desires to attach the bit 37 to the clinch nut 23 before inserting the latter in the perforated metal sheets, he stops the motor after the second step is partly completed, applies the nut to the sheets and then reopens the throttle valve to complete the second step.

The clinch nut driver will function in a similar manner to set rivets, and is of particular value when the work pieces to be joined together prevent the use of conventional riveting apparatus. As shown in Fig. 11, with the present tool, a rivet 23ª having the same general characteristics as the clinch nut is inserted through registering openings in work pieces 91 and 92. While the head of the rivet engages the outer piece 91 the shank is expanded into contact with the inner piece 92, the degree of set imparted to the rivet being limited by the pressure regulator to that just sufficient to hold the work pieces clamped tightly together. For added strength a threaded plug 93 may be screwed into the rivet.

The tool is illustrated in Figs. 12 and 13 as adapted for the dimpling of metal sheets. The parts of the tool shown are the housing sleeve 33, the anvil 36a slidable therein, and the bit 37 together with the rotatable holder 74 therefor. The work engaging end of the anvil 36a is appropriately shaped to cause extrusion of the metal and to complement a recessed die 94. In beginning each dimpling operation the die 94 is held against one side of the work, with a central threaded opening 95 therein aligned with a rivet hole. From the other side of the work the bit 37 is inserted through the rivet hole and into the die opening 95. When the throttle valve is opened the bit turns into threaded engagement with the die which is held against rotation, as by a handle 96. As the bit advances through the die the anvil 36a first comes into contact with the outer work sheet and subsequently the sleeve 33 comes into engagement with the locking cone 81 (not shown). As the bit 37 and holder 74 stop rotating, relative longitudinal movement is enforced between the bit and tool body including the anvil 36a. The die 94, being held against the underside of the work, may be considered stationary so that the bit 37 also becomes a stationary member causing the anvil 36a to be pushed into the oppositely disposed concave area of the die. In squeezing together the anvil 36a and the die 94 the intermediate work sheets are folded inward around the rivet hole in the form of a dimple. Removal of the tool from the work may be accomplished by reversing the direction of rotation of the motor in the same manner that the clinch nut driver is detached from the nut.

What is claimed is:

1. A power tool for installing internally threaded tubular clinch nuts, comprising a bit rotatable into threaded engagement with said clinch nut, an anvil surrounding the bit, a rotary motor, yielding clutch means between said motor and said bit normally effecting rotation of said bit with said motor, a ring surrounding said bit rearward of said anvil and connected to the bit for rotation therewith, said ring and said anvil being movable into tight frictional engagement under the pull of the clinch nut thereby to overcome said yielding clutch means and interrupt rotation of said bit, and means responsive to relative rotary movement between the motor and said bit for effecting axial movement of said bit.

2. A power tool operating to drive a threaded bit in rotary and axial directions, comprising a housing, a rotatable driving shaft therein, a connection between said driving shaft and said bit acting upon relative rotary motion between said elements to effect an axial movement of the bit relative to the housing, said connection acting in the absence of such relative motion to effect rotary movement of the bit with the driving shaft relative to the housing, an anvil surrounding the bit and adapted to abut against the work while the bit rotates into threaded engagement therewith, means holding said anvil against rotary movement relative to the housing, and a cone surrounding said bit and connected to the bit for rotation therewith, said cone being adapted to receive said anvil with a frictional contact after a relative axial movement of predetermined extent between said bit and said anvil to interrupt rotation of the bit and initiate relative axial movement between the housing and the bit.

3. A power tool for the dimpling of metal sheets, comprising a housing, a rotatable driving shaft carried thereby, a threaded bit driven by said shaft, a connection between said driving shaft and said bit acting upon relative rotary motion between said elements to effect a relative axial movement thereof, said connection acting in the absence of such relative rotary motion to effect rotary movement of the bit together with the driving shaft relative to the housing, an anvil surrounding the bit, said anvil being adapted for cooperation with a complementary dimpling die to be held on one side of the work while said bit is passed through the work from the other side and rotated into a threaded opening in the die, means for interrupting rotation of the bit and consequently to initiate relative axial movement between said driving shaft and said bit, and a seat on said housing for cooperation with the anvil means.

4. A power tool for the dimpling of metal sheets, comprising a housing, a rotatable driving shaft carried thereby, a threaded bit driven by said shaft, a connection between said driving shaft and said bit acting upon relative rotary motion between said elements to effect a relative axial movement thereof, said connection acting in the absence of such relative rotary motion to effect rotary movement of the bit together with the driving shaft relative to the housing, an anvil surrounding the bit and movable longitudinally thereof, said anvil being adapted for cooperation with a complementary dimpling die to be held on one side of the work while said bit is passed through the work from the other side and rotated into a threaded opening in the die, said anvil being adapted to abut against the work while said bit advances through the die, means holding said anvil against rotary movement, a cone splined to the bit, said cone being adapted to receive said anvil with a frictional contact after a relative axial movement of predetermined extent between said bit and said anvil to interrupt rotation of the bit and initiate relative axial movement between the driving shaft and bit, and a fixed seat on said housing to which said cone is pressed by said anvil under the thrust of the work in response to axial movement between the driving shaft and the bit, whereby additional axial movement of said bit is accomplished relatively to said anvil.

5. A power tool for the dimpling of metal sheets, comprising a housing, a rotatable driving shaft carried thereby, a threaded bit driven by said shaft, a connection between said driving shaft and said bit acting upon relative rotary motion between said elements to effect a relative axial movement thereof, said connection acting in the absence of such relative rotary motion to effect rotary movement of the bit together with the driving shaft relative to the housing, an anvil surrounding the bit and movable longitudinally thereof, said anvil being adapted for cooperation with a complementary dimpling die to be held on one side of the work while said bit is passed through the work from the other side and rotated into a threaded opening in the die, said anvil being adapted to abut against the work while said bit advances through the die, means controlled by said anvil for interrupting rotation of the bit and consequently to initiate relative axial movement between said driving shaft and said bit, and a seat for said anvil on said housing.

6. A power tool for installing internally threaded flanged clinch nuts comprising a housing adapted to be manually supported, an anvil slidably mounted in said housing and adapted to project beyond the front end thereof, the front end of the anvil having a face adapted to seat against the flange of the clinch nut, a bit surrounded by the anvil and supported therein for relative rotary and axial movements, the front end of the bit projecting beyond the anvil and being threaded for engagement with the internal threads in the clinch nut, power operated means for imparting first rotary and then axial movement of the bit relative to the anvil for installing the clinch nut, and power operated means for imparting axial and rotary movements of the bit relative to the anvil for restoring the parts of the tool to normal condition, said anvil being movable axially relative to the housing in one direction while the clinch nut is being installed and in another direction while the parts are being restored to normal.

7. A power tool according to claim 6 in which a spring is interposed between the anvil and housing to oppose the axial movement first mentioned and to assist or effect the axial movement in the opposite direction during the restoration of the parts.

8. A power tool according to claim 6 which includes threaded adjusting means for regulating the maximum distance that the bit projects beyond the front end of the anvil.

9. A power tool for installing internally threaded flanged clinch nuts comprising a housing adapted to be manually supported, an anvil slidably mounted in said housing, the front end of the anvil being adapted to seat against the flange of the clinch nut, a bit surrounded by the anvil and supported therein for relative rotary and axial movements, the front end of the bit projecting beyond the anvil and being threaded for engagement with the internal threads in the clinch nut, fluid pressure means for imparting first rotary and then rearward movement of the bit relative to the anvil for installing the clinch nut, and valve means for reversing the pressure fluid supply to cause the fluid pressure means to impart forward axial movement of the bit relative to the anvil following the completion of the installation of the clinch nut, said anvil being movable axially relative to the housing in one direction while the clinch nut is being installed and in another direction after the installation is completed.

10. A power tool for deforming metal objects comprising a housing adapted to be manually supported; an anvil slidably mounted in said housing and projecting beyond the front end thereof, the front end of the anvil being adapted to seat against the flange of the work; a bit surrounded by the anvil and supported therein for relative rotary and axial movements, the front end of the bit projecting beyond the anvil and being threaded for engagement with a complementary threaded element; power operated means for imparting first rotary, then combined rotary and axial, and then axial movement of the bit relative to the anvil; and a compression spring interposed between the anvil and housing and adapted to be compressed during the step of combined rotary and axial movement of the bit relative to the anvil and to hold the anvil in engagement with the work.

11. A power tool for deforming metal comprising a housing adapted to be manually supported, an anvil mounted in said housing and projecting forwardly beyond the front end thereof, the front end of the anvil having a face adapted to seat against the work, a bit surrounded by the anvil and supported therein for relative rotary and axial movements, the front end of the bit projecting beyond the anvil and being threaded for engagement with an internally threaded element, power operated means for rotating the bit to screw it into the element until the work seats against the anvil, and means automatically responsive to the seating of the work with sufficient pressure against the anvil for pulling the bit rearwardly relative to the anvil to deform the metal.

12. A portable power tool for deforming metal, comprising a housing, an anvil supported thereby and projecting beyond the front end of the housing, the front end of the anvil having a face adapted to seat against the work, a bit surrounded by the anvil and supported therein for relative rotary and axial movements, the front end of the bit projecting beyond the anvil and being threaded for engagement with a complementary threaded element, power operated means for imparting to the bit a rotary movement to engage the element with the bit and anvil and then to impart to the bit an axial movement relative to the anvil for deforming the metal, said power operated means being driven by a pneumatic motor disposed substantially in alignment with the bit, said housing having a cylindrical portion enclosing the motor and adapted to be enclosed within and grasped by the hand of the operator as the tool is held to the work.

13. A portable power tool according to claim 12 in which a throttle lever is mounted on the housing in position to be grasped by the operator's hand together with the cylindrical portion of the housing.

14. A power tool for installing internally threaded flanged clinch nuts comprising a housing adapted to be manually supported, an anvil slidably mounted in said housing and adapted to project beyond the front end thereof, means for locking the anvil against rotation relative to said housing, the front end of the anvil having a face adapted to seat against the flange of the clinch nut, a bit surrounded by the anvil and supported therein for relative rotary and axial movements, the front end of the bit projecting beyond the anvil and being threaded for engagement with the internal threads in the clinch nut, a rotary driving spindle supported in said housing, and transmission means between said spindle and bit for moving the bit relative to the anvil first in a rotary direction to effect engagement of the clinch nut flange against the anvil as the bit screws into the clinch nut and later in an inward axial direction to collapse the nut upon the anvil.

LESTER A. AMTSBERG.

REFERENCES CITED

The following references are of record in the file of this patent:

UNITED STATES PATENTS

| Number | Name | Date |
|---|---|---|
| 2,283,665 | Cadden | May 19, 1942 |
| 2,283,708 | Troutmann | May 19, 1942 |
| 2,292,446 | Huck | Aug. 11, 1942 |
| 1,873,451 | McKnight | Aug. 23, 1932 |